(12) United States Patent
Javora et al.

(10) Patent No.: US 7,481,273 B2
(45) Date of Patent: *Jan. 27, 2009

(54) METHOD OF USING WATER-IN-OIL EMULSION TO REMOVE OIL BASE OR SYNTHETIC OIL BASE FILTER CAKE

(75) Inventors: Paul H. Javora, Spring, TX (US); Brian B. Beall, Spring, TX (US); Mark A. Vorderburggen, Spring, TX (US); Qi Qu, Spring, TX (US); Sandra L. Berry, Tomball, TX (US)

(73) Assignee: BJ Services Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/820,085

(22) Filed: Jun. 18, 2007

(65) Prior Publication Data
US 2007/0265171 A1 Nov. 15, 2007

Related U.S. Application Data

(60) Continuation-in-part of application No. 11/701,685, filed on Feb. 20, 2007, which is a continuation-in-part of application No. 11/388,103, filed on Mar. 23, 2006, now Pat. No. 7,392,845, which is a division of application No. 10/932,965, filed on Sep. 2, 2004, now Pat. No. 7,188,676.

(51) Int. Cl.
E21B 37/00 (2006.01)
C09K 8/52 (2006.01)

(52) U.S. Cl. ............... 166/300; 166/304; 166/312; 507/203; 507/235; 507/237; 507/905; 507/929

(58) Field of Classification Search .......... 166/291, 166/300, 304, 312; 507/203, 235, 237, 260, 507/267, 905, 929
See application file for complete search history.

(56) References Cited

U.S. PATENT DOCUMENTS

| | | | | |
|---|---|---|---|---|
| 2,343,136 A * | 2/1944 | Dobson et al. | ............... | 507/201 |
| 3,625,286 A | 12/1971 | Parker | | |
| 3,799,874 A | 3/1974 | Parker | | |
| 3,850,248 A | 11/1974 | Carney | | |
| 4,233,162 A | 11/1980 | Carney | | |
| 4,359,391 A * | 11/1982 | Salathiel et al. | ............. | 507/277 |
| 4,445,576 A | 5/1984 | Drake et al. | | |
| 4,588,845 A | 5/1986 | Bull | | |
| 4,594,170 A | 6/1986 | Brown et al. | | |
| 5,247,995 A | 9/1993 | Tjon-Joe-Pin et al. | | |
| 5,355,958 A * | 10/1994 | Pauls et al. | ................. | 166/307 |
| 6,138,760 A | 10/2000 | Lopez et al. | | |
| 6,562,762 B2 * | 5/2003 | Cowan et al. | ................ | 507/110 |
| 6,631,764 B2 * | 10/2003 | Parlar et al. | .................. | 166/278 |
| 6,730,234 B2 | 5/2004 | Symens et al. | | |
| 6,978,838 B2 | 12/2005 | Parlar et al. | | |
| 7,134,496 B2 * | 11/2006 | Jones et al. | .................. | 166/278 |
| 7,188,676 B2 * | 3/2007 | Qu et al. | ...................... | 166/312 |
| 7,222,672 B2 * | 5/2007 | Blauch et al. | ................ | 166/278 |
| 2005/0155761 A1 * | 7/2005 | Blauch et al. | ................ | 166/278 |

FOREIGN PATENT DOCUMENTS

EP 0 559 418 A2 8/1993

OTHER PUBLICATIONS

U.S. Appl. No. 11/731,388, filed Mar. 30, 2007, Javora et al.
Berry, S.L. et al; "Laboratory Development and Application of a Synthetic Oil/Surfactanl System for Cleanup of OB and SBM Filter Cakes"; Society of Petroleum Engineers (SPE 97857); 2006: pp. 1-12.
Berry, S.L.; "Optimization of Synthetic-Based and Oil-Based Mud Displacements with an Emulsion-Based Displacement Spacer System"; Society of Petroleum Engineers (SPE 95273); 2005; pp. 1-11.
Shrieve Chemical Products & Shrieve Products International Ltd.; "Product Data Sheet BIO-BASE® 560 Base fluid with a high n-paraffin content"; Jul. 2004.
Shrieve Chemical Products & Shrieve Products International, Ltd.; "Material Safety Data Sheet BIO-BASE® 637"; May 2004; pp. 1-9.

* cited by examiner

*Primary Examiner*—George Suchfield
(74) *Attorney, Agent, or Firm*—Jones & Smith, LLP; John Wilson Jones

(57) ABSTRACT

Fluid producing or injecting wells may be treated with a water-in-oil emulsion for the removal or inhibition of unwanted particulates, including pipe dope, asphaltenes and paraffins. In addition, such emulsions are effective in the displacement of oil base drilling muds and/or residues from such muds from wells. The emulsion may also be used to break the interfacial and/or rheological properties of oil base mud and synthetic oil base mud filter cakes, and act as a demulsifier to break the water-in-oil emulsion present in such oil base and synthetic oil base muds. The water-in-oil emulsions may optionally contain a dispersing agent as well as a surfactant.

27 Claims, No Drawings

METHOD OF USING WATER-IN-OIL EMULSION TO REMOVE OIL BASE OR SYNTHETIC OIL BASE FILTER CAKE

This application is a continuation-in-part application of U.S. patent application Ser. No. 11/701,685, filed on Feb. 20, 2007, which is a divisional application of U.S. patent application Ser. No. 10/932,965, filed on Sep. 2, 2004, now U.S. Pat. No. 7,188,676. This application is further a continuation-in-part application of U.S. patent application Ser. No. 11/388,103, filed on Mar. 23, 2006.

FIELD OF THE INVENTION

The invention relates to the use of water-in-oil emulsion compositions for use in oil field production and injection operations. Such compositions have particular applicability in the removal of drilling muds, scale, heavy crude, paraffins and/or asphaltenes from subterranean formations. In addition, the compositions have particular applicability in breaking oil base mud and synthetic oil base mud filter cakes.

BACKGROUND OF THE INVENTION

The increased production flow area provided by a horizontal, as compared to a vertical, wellbore has driven an increase in the drilling and completion of horizontal wells. Such wells have long open-hole sections which remain in contact with the drilling fluid for long periods of time in overbalanced conditions, forming a filter cake on the formation and also thereby initiating solids invasion that may induce formation damage. Regardless of the type of drilling conducted, the selection of drilling fluid has a major effect on minimizing skin development and maximizing fluid and gas production or injection.

Efficiency in the overall production of fluids and gases from a well or injection into a well is further highly dependent on the effectiveness of production and injection chemicals. Such production chemicals include completion fluids as well as treatment solutions for production stimulation. It is understood that chemicals and treatments used to improve production out of a well are also used to improve injection into a well.

Exemplary production chemicals include aqueous acid solutions which are often used to increase the permeability of a formation. Injection of the aqueous acid solution into the formation results in dissolution of mineral constituents, thereby producing flow channels. In such methods, difficulties are often encountered due to water-in-oil emulsions (having crude oil deposits as the outer phase) which are formed downhole at the interfaces between the injected aqueous treating solutions and crude oil contained in the formations. Solids and particulates, such as fines and insoluble reaction products, accumulate at the oil-water interfaces and stabilize the emulsions which in turn tend to plug the pore spaces in the formations being treated, thereby restricting the flow of the treating solutions and subsequent production of fluids therethrough. While a variety of additives having surface active properties have been developed for preventing the formation of emulsions, sludge, etc., as well as preventing the corrosion of metal surfaces, and have been included in the various treating solutions employed, less than desirable results are often achieved.

In addition, and particularly where aqueous acid treating solutions are utilized, sludge formed as a result of the reaction of the acid with asphaltic materials contained in the crude oil can plug the pore spaces of the formations.

Solids and particulates are known to negatively impact the overall efficiency of completion of wells. These include asphaltene, paraffin deposits and scales. Asphaltenes are most commonly defined as that portion of crude oil which is insoluble in heptane. Asphaltenes exist in the form of colloidal dispersions stabilized by other components in the crude oil. They are the most polar fraction of crude oil, and often will precipitate upon pressure, temperature, and compositional changes in the oil resulting from blending or other mechanical or physicochemical processing. Asphaltene precipitation occurs in pipelines, separators, and other equipment. Once deposited, asphaltenes present numerous problems for crude oil producers. For example, asphaltene deposits can plug downhole tubulars, wellbores, choke off pipes and interfere with the functioning of separator equipment.

Residues from drilling muds further negatively impact the overall efficiency of completion of wells. Commonly employed drilling muds are gaseous or liquid. Liquid drilling muds have a water base or an oil base. The aqueous phase of the more common water base muds may be formed of fresh water or a brine. As a discontinuous or disperse phase, water base fluids may contain gases or water-immiscible fluids, such as diesel oil, in the form of an oil-in-water emulsion, and solids including weighting materials, such as barite. Water base fluids also typically contain clay minerals, polymers, and surfactants for achieving desired properties or functions.

Oil base fluids are often referred to as oil based muds (OBM) and synthetic based muds (SBM). Most OBMs and SBMs are invert emulsions composed of an aqueous phase dispersed or surrounded by a continuous oil phase. OBM and SBM filter cakes, composed of colloid particles, weighting material, drilled solids and water or brine droplets dispersed in the oil phase, are hydrophobic and exhibit a permeability which is typically lower than the permeability of the formation.

Oil base fluids offer performance advantages over water base fluids. Such advantages include higher penetration rates, improved lubricity, shale stability, decreased fluid loss, and thinner filter-cake characteristics. In addition, oil base fluids provide gauge hole, higher rates of penetration and deeper bit penetration. Furthermore, fluid losses to the formation from oil base or synthetic oil base fluids tend to be less damaging since the base fluid is oil rather than water. Oil base fluids, however, are usually more difficult to remove due to the hydrophobic nature of the base fluid and impermeable nature of the deposited filter cake.

Solids and particulates not only cause a restriction in pore openings in the formation (formation damage) and hence reduction in the rate of oil and/or gas production, but also cause blockage of tubular and pipe equipment during production and surface processing. It is well known that production efficiency increases if such unwanted solids and particulates are removed from the wellbore.

To remove such particulates, the well is generally subjected to shut-in, whereby compositions are injected into the well, usually under pressure, and function to remove the unwanted particulates. Shut-ins are typically performed regularly in order to maintain high production or injection rates. Shut-ins constitute down time when no production or injection takes place. Thus, a reduction in total production or injection corresponds to the number of down times during the shut-in operation.

Production is further decreased when ineffective chemicals are used during shut-in. For instance, ineffective scale inhibitors fail to reduce total scale build-up. Poor displacement of drilling mud results in solid residues and mud residues left in the wellbore which, in turn, typically leads to formation damage, etc. Similar displacement or mud removal procedures are also performed before cementing. Mud residue can lead to weak bonding between cement and the formation surface and gas leakage when the well is turned to production.

The prior art has recognized the use of surfactants in the displacement and removal of oil base muds. Surfactants are first dissolved in fresh water or seawater at the concentration of 5 volume percent or more and the resulting liquid is then pumped at sufficient rate to generate turbulent flow to facilitate the mud cleaning process. Although surfactant systems have been widely used in field applications, their effectiveness is often limited by solvency capacity. In addition, the efficiency of surfactant systems varies for different muds and is negatively impacted by the condition of the mud when the displacement is conducted.

Historically, solvent- or aqueous-based systems have been used in mud displacement processes as well as in processes to effectuate the removal of oil based and synthetic oil based filter cakes. While aqueous surfactant based systems are generally selected over solvent treatments as mud displacement and mud filter cake clean-up treatments, surfactant systems are often ineffective. For instance, surfactant based systems are typically ineffective at breaking the emulsion inside the filter cake and effecting complete phase separation. Further, aqueous surfactant based treatments often create additional damage by forming an emulsion block with the formation oil. Such emulsion blocks have the potential to block production or injection. Further, such systems are either not biodegradable or are less efficacious than desired.

In most cases, due to strong solvency of the organic solvent toward the base oil in oil based mud, solvents have shown good mud removal and cleaning effects in both laboratory and field applications. However, pure organic solvent is generally expensive and often becomes cost prohibitive. Although water can be mixed with organic solvent to cut the fluid cost, the effectiveness of the system can be greatly reduced, even at levels as low as 10 to 20 volume percent of water content. In other cases, especially when solid content in the mud or mud residue is high and the mud viscosity is significant, pure solvent is often not effective.

Organic solvents are further often used in formation clean-up or near wellbore damage removal when the damage is caused by asphaltene or paraffin deposition as well as scale deposition. Very often the solvents are aromatic and leave an environmental footprint. In other cases, the solvent is not effective, especially when suspension and dispersion of solids is desired. Pure organic solvents cannot effectively break up solid aggregation and does not facilitate solid suspension.

Improved production chemicals are therefore desired for the treatment of fluid producing or injecting wells which are capable of removing or inhibiting the formation of unwanted solids and particulates within the well.

For instance, in order to meet more challenging drilling applications such as for use in deepwater and high-temperature, high-pressure (HTHP) applications, and further to meet stricter health, safety, and environmental standards, new systems to displace and/or remove OBM and SBM filter cakes have been sought. In particular, there is a need for new systems that do not cause the problems associated with the aqueous systems of the prior art and which further are biodegradable.

SUMMARY OF THE INVENTION

A fluid producing or injecting well penetrating a subterranean formation is treated, in accordance with the invention, with a water-in-oil emulsion. In addition to treating oil and gas wells, the emulsion has particular applicability in the treatment of injection wells. Preferably, the emulsion is biodegradable.

Such emulsions are capable of removing or inhibiting the formation of unwanted solids and particulates, including pipe dope, asphaltenes and paraffins, within the well and further serve to improve the permeability of the formation.

Such emulsions are also efficacious in displacing oil based drilling muds and/or residues from such muds from wells. Further, the emulsions are highly efficacious in the removal of oil based mud (OBM) and synthetic oil based mud (SBM) filter cakes from the well and/or formation face. The percent mud cake removal, which is indicative of disaggregating of the filter cake and solids removal, is high when water-in-oil emulsions are used to remove oil based and synthetic oil based filter cakes. As such, water-in-oil emulsions are highly efficient in breaking the residual emulsion inside the filter cake, decreasing cake cohesion and reducing cake adherence to the formation face.

The present invention relates therefore to a process for increasing the effectiveness of production chemicals by reducing the number and duration of shut-in operations needed to increase the production rate from or into a well.

The water-in-oil emulsion, or reverse emulsion, for use in the invention consists of an outer (or continuous) hydrophobic phase which is particularly useful in dissolving oil residues. In addition, the outer phase is particularly useful in dissolving unwanted particulates or loosening such particulates, like asphaltene and/or paraffin and/or OBM or SBM residues, which have been deposited within the wellbore and/or onto the formation face and/or within the formation.

The emulsion is particularly efficacious in the removal of oil base or synthetic oil base filter cakes. The emulsions are capable of breaking the interfacial and/or rheological properties of filter cakes and muds, thereby acting like a demulsifier to break OBM or SBM water-in-oil emulsions and adherence of the filter cake to the wellbore and formation. In some instances, when the emulsion is specifically formulated, the emulsion may pass the "no-sheen" requirement, for use in Gulf of Mexico applications, wherein the emulsion does not produce a silvery or iridescent sheen on the surface of seawater. The emulsion may be lighter than water and cover the surface of the water, dissipating over time.

The water-in-oil emulsions may optionally contain a dispersing agent as well as a surfactant. The dispersing agent may act as a pH adjusting agent. The water phase may further include scale inhibitors, pH adjusting agents, corrosion inhibitors, rust removing agents, bactericides, hydrogen sulfide scavengers, and/or other chemical additives. The external phase of the emulsion may further contain a surfactant dissolved or dispersed in the outer hydrophobic phase.

The water-in-oil emulsion used in the invention typically provides excellent particle suspension capacity. Such capacity prevents particulates from redepositing within the well, e.g., on tubings, casings or the formation surface.

DETAILED DESCRIPTION OF THE PREFERRED EMBODIMENTS

The water-in-oil emulsion, or reverse emulsion, for use in the invention consists of an outer (or continuous) hydrophobic phase which is particularly useful in dissolving oil residues and can be specially formulated to be biodegradable. In addition, the outer phase is particularly useful in dissolving unwanted particulates or loosening such particulates, like asphaltene and/or paraffin, which have been deposited within the wellbore, onto the formation face or within the formation. It is also useful to remove pipe dope which is routinely used to prevent seizing when pipe connections are made. In addition, the emulsion of the invention is useful in stimulating a well by removing unwanted particulates and thereby improving permeability of the formation.

In a preferred embodiment, the emulsion is used after drilling is complete in order to displace, clean-up or remove the oil based mud (OBM) or synthetic oil based mud (SBM) filter cake from the formation face as well as residues from such muds from producing or injecting wells. This, in turn, minimizes skin and formation damage, increases production or injection flow and restores the productive zone to a near-natural state. Such clean-up treatments are needed in order to break down the interfacial and/or Theological properties of the filter cake, wash the damaged zone of the wellbore and restore fluid transfer properties.

The internal (or discontinuous) phase of the water-in-oil emulsion is water, to which may be added any conventional additive used to treat unwanted particulates. The aqueous internal phase may be an aqueous salt solution such as sodium formate brine, potassium formate brine, cesium formate brine, sodium bromide brine, potassium bromide brine, calcium bromide brine, zinc bromide brine, cesium bromide brine, calcium chloride brine, sodium chloride brine, potassium chloride brine, cesium chloride brine, seawater and mixtures thereof. The use of such salts may be used to increase the density of the water-in-oil emulsion in those situations where higher density is sought at the interface. (Reference herein to "water" as the internal phase of the water-in-oil emulsion shall include such aqueous salt solutions.)

Unwanted particulates, such as solids from an oil based or synthetic oil based filter cake may be dispersed into the aqueous phase of the emulsion and removed, along with residual filter cake, from the wellbore. As such, the water-in-oil emulsion digests at least a portion of the filter cake such that at least a portion of the solids are dispersed in the aqueous phase of the emulsion. The aqueous phase containing the unwanted solids then separates from the filter cake. The hydrophobic outer phase of the water-in-oil emulsion is capable of dissolving at least a portion of the oil in the OBM or SBM filter cake and dispersing oil-wet solids and particulates.

In a preferred embodiment, the external phase is a hydrophobic organic solvent. Mixtures of organic solvents may also be used. The hydrophobic organic solvent is either non-miscible in or slightly miscible with water. Preferred solvents include aromatic petroleum cuts, terpenes, mono-, di- and tri-glycerides of saturated or unsaturated fatty acids including natural and synthetic triglycerides, aliphatic esters such as methyl esters of a mixture of acetic, succinic and glutaric acids, aliphatic ethers of glycols such as ethylene glycol monobutyl ether, minerals oils such as vaseline oil, chlorinated solvents like 1,1,1-trichloroethane, perchloroethylene and methylene chloride, deodorized kerosene, solvent naphtha, paraffins (including linear paraffins), isoparaffins, olefins (especially linear olefins) and aliphatic or aromatic hydrocarbons (such as toluene). In one embodiment of the invention, the external phase consists of a surfactant dissolved or dispersed in a paraffinic base oil.

Terpenes are preferred, especially d-limonene (most preferred), l-limonene, dipentene (also known as 1-methyl-4-(1-methylethenyl)-cyclohexene), myrcene, alpha-pinene, linalool and mixtures thereof.

Further exemplary organic liquids include long chain alcohols (monoalcohols and glycols), esters, ketones (including diketones and polyketones), nitrites, amides, amines, cyclic ethers, linear and branched ethers, glycol ethers (such as ethylene glycol monobutyl ether), polyglycol ethers, pyrrolidones like N-(alkyl or cycloalkyl)-2-pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, and alkylene or alkyl carbonates. These include polyalkylene glycols, polyalkylene glycol ethers like mono (alkyl or aryl) ethers of glycols, mono (alkyl or aryl) ethers of polyalkylene glycols and poly (alkyl and/or aryl) ethers of polyalkylene glycols, monoalkanoate esters of glycols, monoalkanoate esters of polyalkylene glycols, polyalkylene glycol esters like poly (alkyl and/or aryl) esters of polyalkylene glycols, dialkyl ethers of polyalkylene glycols, dialkanoate esters of polyalkylene glycols, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, and dibutyl carbonate, lactones, nitromethane, and nitrobenzene sulfones. The organic liquid may also be selected from the group consisting of tetrahydrofuran, dioxane, dioxolane, methyltetrahydrofuran, dimethylsulfone, tetramethylene sulfone and thiophene.

In one preferred embodiment, the hydrophobic organic solvent is a base oil containing between from about 75 to about 99, preferably from about 85 to about 95, most preferably about 90, percent by weight of linear paraffins (alkanes), the remainder being olefins (alkenes). The base oil typically exhibits low viscosity (for instance, as low as 1.99 cSt (ASTM D-445). Preferred base oils include Bio-Base®637 (a mixture of alkanes and alkenes) and Bio-Base®560 (a hydrocarbon blend containing 90% linear paraffins —n-paraffins or n-alkanes), both of which are commercially available from Shrieve Chemical Products. With such formulations, the volume percent of the base oil in the emulsion is between from about 50 to about 75, preferably between from about 55 to about 65, volume percent.

The emulsion may be formed by conventional methods, such as with the use of a homogenizer, with the application of shear. Surfactants/emulsifiers may be added to the emulsion to help stabilize and further facilitate formation of the emulsion.

The composition for use in the invention may further contain a surfactant. (As used herein, the term "surfactant" is synonymous with the term "emulsifying agent" or "emulsifier".) The surfactant is preferably hydrophobic though it may be characterized as having portions which are strongly attracted to each of the phases present, i.e., hydrophilic and hydrophobic portions. In a preferred embodiment, the external phase of the emulsion contains a surfactant dissolved or dispersed in the base oil. Suitable surfactants include nonionic as well as ionic surfactants.

The water-in-oil emulsion for use in the invention is preferably polymer-free and may be prepared by first mixing the surfactant, capable of forming the emulsion, with the hydrophobic organic solvent. An optional dispersing agent may then be added and finally an appropriate amount of water may be added, all under agitation. The resulting water-in-oil emulsion consists of an outer oil (organic) phase and is particularly useful in dissolving the base oil and dispersing oily solid and particulate aggregates from oil base muds, as well as dissolving, dispersing or loosening asphaltene and/or paraffin deposits. The inner water phase further is characterized by a low pH and is capable of dispersing the unwanted solids from the mud. In a preferred embodiment, the inner water phase is further characterized by high pH.

At least a portion of the solvent may be replaced with water. Mixing water with the organic solvent minimizes the expense of producing the emulsion. The amount of water which may be added to the organic solvent is an amount that will maintain the hydophobicity of the organic solvent.

Typically the amount of water forming the water-in-oil emulsion is between from about 10 to about 90, preferably between from about 20 to about 80, volume percent. In one embodiment of the invention, the water is present in the emulsion in an amount between from about 25 to about 35, typically around 28, volume percent. The water typically increases the viscosity of the emulsion, rendering a higher carrying capacity for removed solids. In addition, it serves as a solvent for the pH adjuster and a means to activate the surfactant.

Suitable surfactants include acetylated monoglycerides, sorbitan esters including polyoxyalkylene sorbitan esters, lecithins, fatty amines, fatty amine carboxylates, fatty amides, fatty amide carboxylates, polyoxyl castor oil derivatives, macrogol esters, nonionic polyesters, nonionic hydrophobic-hydrophilic polyesters, caprylic/capric triglycerides, polyoxyalkylated glycolysed glycerides, mixture of mono-, di- and triglycerides and mono- and di-fatty esters of poly-alkylene glycol. Preferred are fatty acids such as $C_8$-$C_{10}$ caprylic/capric acids, fatty amine carboxylates, polyethylene glycol hydrogenated castor oil, nonionic hydrophobic-hydrophilic polyesters, polyethylene glycol glyceryl esters, lecithin, cholesterol and proteins such as casein. Multiple emulsifying agents can further be used.

Suitable surfactants further include ionic as well as non-ionic compounds, including those having a hydrophilic lipo-philic balance (HLB) in the range of about 1 to about 30. In a preferred embodiment, the surfactant is nonionic, preferably having an HLB between from 2 to about 20, more preferably from about 2 to about 10.

Examples of these surfactants are alkanolamides including fatty acid diethanolamides, alkylarylsulfonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, glycerol esters, glycol esters, lecithin and derivatives, lignin and derivatives, monoglycerides and derivatives, olefin sulfonates, phosphate esters and derivatives, propoxylated and ethoxylated fatty acids or alcohols or alkyl phenols, amine oxides, sorbitan derivatives such as sorbitan fatty acid esters, sucrose esters and derivatives, alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids.

Suitable as nonionic surfactants are alkyl and alkylaryl polyether alcohols such as linear or branched polyoxyethylene alcohols, more preferably linear polyoxyethylene alcohols, comprising (a) from about 8 to about 30, preferably about 8 to about 20, carbon atoms, and (b) comprising about 3 to about 50 moles, most preferably about 3 to about 20 moles, ethylene oxide. Most preferred non-ionic surfactants are linear polyoxyethylene alcohols having from about 13 to about 15 carbon atoms and comprising about 10 moles ethylene oxide. Further, preferred surfactants include nonylphenol ethoxylate having a HLB value of about 16 and comprising 20 ethylene oxide units per molecule, octylphenol ethoxylate having an HLB value greater than 13.5, and nonylphenol ethoxylate having a HLB value greater than 13. Further suitable surfactants include oxyalkylated alkyl phenols like octylphenol polyethylene oxide ethers and nonylphenol polyethylene oxide ethers as well as linear alcohol polyethylene oxide ethers and sorbitan monooleate polyethylene oxide ethers, including those sold under the commercial names of TERGITOL, TRITON, BRIJ, TWEEN and MAKON.

In another preferred embodiment, the non-ionic surfactants are a combination of alkylaryl ethoxylate and a polyethylene glycol (PEG) ester of fatty acids. Preferably, the alkylaryl ethoxylate is octyl, nonyl or dodecylphenol with 3 to 13 moles of ethylene oxide, while the PEG ester is of molecular weight range 200-600 with either one or two moles of unsaturated fatty acids.

Further preferred as nonionic surfactants are polyoxyethylene sorbitan monopalmitate, polyoxyethylene sorbitan monostearate, polyoxyethylene sorbitan monooleate, linear alcohol alkoxylates, alkyl ether sulfates, linear nonyl-phenols, ethoxylated castor oils such as polyethylene glycol castor oil, dipalmitoylphosphatidylcholine (DPPC), polyoxyethylene (8.6) nonyl phenyl ether, ethylene oxide sulfonates (e.g., alkyl propoxy-ethoxysulfonate), alkyl propoxy-ethoxysulfate, alkylarylpropoxy-ethoxysulfonate and highly substituted benzene sulfonates.

Included within nonionic surfactants are alkyl alkoxylates and those wherein the hydrophilic part of the molecule contains one or more saccharide unit(s) such as those derived from sugars like fructose, glucose, mannose, galactose, talose, gulose, allose, altose, idose, arabinose, xylose, lyxose and/or ribose, including alkylpolyglycosides.

The ionic surfactants can be amphoteric such as alkyl betaines, alkyldimethyl betaines, alkylamidopropyl betaines, alkylamido-propyldimethyl betaines, alkyltrimethyl sulfobetaines, imidazoline derivatives such as alkylamphoacetates, alkylamphodiacetates, alkylamphopropionates, alkylamphodipropionates, alkylsultains or alkylamidopropyl hydroxysultains, amine oxides or the condensation products of fatty acids and protein hydrolysates.

Anionic surfactants can include hydrosoluble salts of alkylsulfates, alkylethersulfates, alkylsulfonates, alkylisethionates and alkyltaurates or their salts, alkylcarboxylates. alkylsulphosuccinates or alkylsuccinamates, alkylsarcosinates, alkylated derivatives of protein hydrolysates. acylaspartates, and alkyl and/or alkylether and/or alkylarylether ester phosphates and phosphonates. The cation is generally an alkali or alkaline-earth metal such as sodium, potassium, lithium, magnesium or an ammonium group $NR_4^+$ where R, which may be identical or different, represents an alkyl and/or aryl group which may or may not be substituted by an oxygen or nitrogen atom.

The surfactant when present is in a quantity sufficient to maintain the present composition as an emulsion. In one embodiment, it is present at a level of about 0.005 to about 20 weight percent, preferably from about 0.005 to about 15 weight percent, more preferably from about 3.5 to about 15, most preferably from about 4 to about 10, weight percent. When used to treat OB/SB mud samples, optimization of the oil/surfactant system should preferably be conducted on a given OB/SB mud sample to determine the proper concentration of active surfactants required to obtain complete breaking of the emulsion inside the filter cake and disruption of the cake cohesion.

The dispersing agent serves to disperse solids upon the in situ removal of oil or organic deposits mixed with solid particles. The dispersing agent is preferably an inorganic or organic acid or salts or esters and may, optionally, function as a pH adjusting agent.

Suitable dispersing agents include organophosphate esters, including salts thereof, such as alkali metal salts. These embrace a diversity of predominantly partially esterified phosphorus containing surface active materials, including alkyl orthophosphates, e.g., mono (2-ethylhexyl) orthophosphate and di(2-ethylhexyl) orthophosphate and mixtures thereof, as well as partial esters of polyphosphoric acids, glycerophosphoric acid, sugar phosphates, phosphatidic acids having long-chain fatty acyl groups, amino phosphoric acids, and partial phosphate esters of nonionic surfactants. Exemplary and preferred partial phosphate ester dispersants include, for example, phosphated polyoxyethylated nonylphenols; cetyl phosphates and oxyethylated cetyl phosphates; mono or di phosphate esters made from aromatic (phenols) or linear alcohols, usually polyoxyethylated; and phosphated fatty glycols.

Preferred dispersing agents include aliphatic phosphonic acids with 2-50 carbons, such as hydroxyethyl diphosphonic acid, and aminoalkyl phosphonic acids, salts and esters thereof, e.g. polyaminomethylene phosphonates with 2-10 N atoms e.g. each bearing at least one methylene phosphonic acid group; examples of the latter are ethylenediamine tetra (methylene phosphonate), diethylenetriamine penta(methylene phosphonate) and the triamine- and tetramine-polymethylene phosphonates with 2-4 methylene groups between each N atom, and for example, with at least 2 of the numbers of methylene groups in each phosphonate being different. Other preferred dispersing agents include lignin or derivatives of lignin such as lignosulfonate and naphthalene sulfonic acid and derivatives.

The amount of dispersing agent added to the composition is an amount sufficient to maintain the dispersed particles in dispersion. Typically the amount of dispersing agent to the composition is between from about 0.5 to about 50 weight percent (based on the total weight of the composition).

The composition may further contain a suitable amount of a pH modifying agent such as mineral acids (like hydrochloric acid), organic acids (like formic acid, acetic acid, or citric acid), and chelating agents, in particular cationic salts of polyaminocarboxylic acids chelating agents. For instance, a 10% HCl could be used to lower the pH to about −1. The pH of the formulation is suitably from about—1 to about 6.

The aqueous inner phase may further contain any additive used in the art to improve productivity, such as pH adjustment agents, corrosion inhibitors, scale inhibitors, rust removers, hydrogen sulfide scavengers and bactericides. Such agents may be used in place of or in combination with the dispersing agent. For instance, soda ash may be used as a pH adjuster to raise the pH to from about 7 to about 10 or more, and most preferably about 9 to 10. The scale inhibitor is effective in stopping calcium and/or barium scale with threshold amounts rather than stoichiometric amounts. Conventional scale inhibitors may be used, such as water-soluble organic molecules with at least 2 carboxylic and/or phosphonic acid and/or sulfonic acid groups e.g. 2 to 30 such groups, oligomers or polymers, or may be a monomer with at least one hydroxyl group and/or amino nitrogen atom, especially in a hydroxycarboxylic acid or hydroxy or aminophosphonic acid, or, sulfonic acid.

Examples of corrosion inhibitors are non-quaternized long aliphatic chain hydrocarbyl N-heterocyclic compounds.

The hydrogen sulfide scavenger may be an oxidant, such as an inorganic peroxide, e.g. sodium peroxide, or chlorine dioxide, or an aldehyde, e.g. of 1 to 10 carbons such as formaldehyde or glutaraldehyde or (meth)acrolein.

Further, the emulsion may be used in conjunction with an alcohol, glycol or glycol ether which principally serves to enhance the emulsion. Suitable alcohols, glycols and glycol ethers include mid-range primary, secondary and tertiary alcohols with between 1 and 20 carbon atoms, such as t-butanol, n-butanol, n-pentanol, n-hexanol and 2-ethyl-hexanol as well as detergent range alcohol ethoxylates, ethylene glycols (EG), polyethylene glycols (PEG), propylene glycols (PG) and triethylene glycols (TEG). When employed, the alcohol, glycol or glycol ether (or combinations thereof) may be present in the emulsion in an amount between from about 1 to about 50 volume percent, more typically between 1 and 20 volume percent, and most typically between 1 and 5 volume percent.

The emulsion may further be used in conjunction with enzymes, buffers, surfactants, oxidizers and/or chemical breakers conventional in the art.

The water-in-oil formulations of the present invention may be prepared on the platform or can be prepared at a plant and transported as such to the site of use. Typically, the oil soluble components such as certain corrosion inhibitors and surfactants, are mixed with the solvent, and then the aqueous phase in appropriate proportions is slowly mixed in using high shear to achieve the desired homogeneity. Typically the aqueous phase contains the water soluble dispersing agents, surfactants and/or other additives.

The oil based emulsions have particular applicability since they inhibit the generation of water based emulsions in the formation. In addition, the oil based surfactant emulsions provide a more economical alternative to solvent-based systems. Further, the emulsions may further be used as breakers to weaken and remove OBM and SBM filter cakes. The emulsions are capable of separating an OBM or SBM into its component phases. Use of a water-in-oil emulsion is also effective in avoiding the generation of an emulsion with the formation oil, which apparently can form when certain aqueous based surfactant systems are used. Such emulsion blocks have the potential to create substantial damage to the formation.

In addition to treating fluid producing wells, the compositions of the invention have applicability in injection wells, wherein fluids are injected rather than produced.

The following examples demonstrate the more salient features of the invention. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

In the Examples, the following components were used:

Bio-Base 637 is a mixture of alkanes and alkenes, a product of Shrieve Chemical Products Co.

Tween®81 is a polyoxyethylene (5) sorbitan monooleate, a product of ICI America, Inc.

Paravan 25, a product of BJ Services Company, contains d-limonene, and is capable of cleaning oil or organic deposits;

SP-78, a product of Special Products Inc., is an organophosphonate dispersing agent which further functions as a pH reducing agent;

Viscoflex-X, a product of BJ Services Company, is a surfactant comprising about 24% by weight of ethylene glycol monobutyl ether and about 76% by weight of lecithin. Viscoflex-X is used as an emulsifier to promote water-in-oil emulsions;

CI-25, a product of BJ Services Company, is a corrosion inhibitor comprising a blend of quaternary salts, alcohols, formamide and ethoxylated nonylphenol;

MDR-1, a product of BJ Services Company, is an active dispersing agent which further functions as a pH adjusting agent;

MDR-E, a product of BJ Services Company, is an active emulsifying agent capable of emulsifying a glycol ether solvent;

E-31, a product of BJ Services Company, is an oil external emulsifier which provides a stable emulsion that retards the activity of HCl by limiting contact between the acid and formation; and US-40, a product of BJ Services Company, is a mutual solvent of ethylene glycol monobutyl ether.

Example 1

This Example illustrates the displacement process for eliminating drilling mud components, especially solids and oil, from a well system prior to introduction of solids-free completion and/or packer brine. All percentages expressed in this Example are in weight percentages. The drilling mud is displaced from the well system by circulating therein. Two compositions were tested as designated below:

| Composition 1: | Composition 2: |
| --- | --- |
| 40% Paravan | 94% Paravan |
| 1% Viscoflex - X | 1% Viscoflex - X |
| 5% SP-78 | 5% SP-78 |
| 54% water | |

The compositions were used with sludge produced from a well of Venezuelan crude oil.

Mud displacement: 100 ml of mud sample was poured into a glass jar (4 oz) to coat the wall completely and excess mud was poured out. 100 ml of Composition 1 and 2 were poured into separate sludge treated jars, respectively, and stirred under constant RPM. After a pre-defined time, the liquids were poured out and the jars were examined for mud removal efficiency. Composition 1 effectively removed the muds 100% within 5 minutes. The organic solvent in Composition 1 can be further reduced to 30% by volume. For Composition 2, a contact time of 10 minutes was needed for 100% cleaning efficiency.

Sludge and Paraffin/Asphaltene Removal: A mud sludge or crude with high content of paraffin/asphaltene was first coated on the inner surface of a glass jar. 100 ml of Composition 1 and 2 were poured into separate sludge-treated jars and stirred under constant RPM. After pre-defined time, the liquids were poured out and the jars examined for mud removal efficiency. Composition 1 completely removed heavy crude oil with high content of asphaltene from a glass jar within 7 minutes of contact time. Composition 2 cleaned all the mud and sludge 100% within 2 minutes of contact time.

The Example demonstrates use of the invention as a spearhead fluid which can remove the heavy crude and asphaltene from the formation and leave its surface clean for subsequent well treatments.

Example 2

An emulsion was prepared consisting of 65% Bio-Base 637, 28% water, 3 pounds per barrel (ppb) soda ash and 7% Tween 81. (All percentages expressed in this Example are volume percentages.) The emulsion was prepared by introducing the oil and surfactant into a vessel and mixing the components at room temperature until uniformly mixed, about 10 minutes. To the resultant was added an aqueous system containing the soda ash. The components were then mixed at room temperature until uniformly mixed, about ten minutes. The resulting product, Treatment Emulsion, contained linear paraffins and surfactant as the external phase and an aqueous internal phase. The pH of the emulsion was approximately 9.5.

Examples 3-12

Ten field drilling mud systems from actual drilling operations with varying compositions were used to evaluate the effectiveness of the Treatment Emulsion to break down the interfacial and/or rheological properties of the mud cakes and adherence of the cakes to the formation. Table I outlines the ten drilling mud systems as well as their mud density and rheological properties at 70° F.

TABLE I

| Example No. | Density | Fann Dial Readings 600/300 | Fann Dial Readings 200/100 | Fann Dial Readings 60/30 | Fann Dial Readings 6/3 | 10 sec Gel/10 min Gel |
| --- | --- | --- | --- | --- | --- | --- |
| 3 | 14.0 ppg | 200/110 | 75/42 | 27/17 | 6/5 | 5/25 |
| 4 | 9.0 ppg | 67/47 | 40/30 | 22/17 | 9/7 | 2/10 |
| 5 | 9.2 ppg | 105/62 | 45/25 | 15/6 | 1/1 | 1/2 |
| 6 | 14.0 ppg | 48/28 | 19/12 | 8/7 | 3/2 | 3/5 |
| 7 | 12.5 ppg | 64/34 | 24/12 | 12/7 | 2/1 | 1/1 |
| 8 | 13.3 ppg | 186/100 | 70/41 | 26/16 | 6/5 | 9/12 |
| 9 | 15.5 ppg | >320/220 | 172/92 | 57/32 | 8/5 | 7/22 |
| 10 | 15.9 ppg | 133/75 | 55/33 | 21/14 | 6/5 | 5/8 |
| 11 | 18.5 ppg | 292/160 | 112/62 | 42/27 | 12/9 | 10/14 |
| 12 | 18.8 ppg | >320/192 | 137/77 | 53/35 | 16/14 | 4/22 |

A dynamic (stirred) high-temperature high-pressure (HTHP) fluid loss cell was used to evaluate the effectiveness of the Treatment Emulsion in removing the drilling mud filter cakes. This HTHP filter press was used to measure filtration properties under varying dynamic downhole temperature conditions. A motor driven shaft was fitted with a propeller blade rotated at varying speeds inside a standard 500 ml HTHP cell. RPM setting from 1 to 1600 rpm were selected to give laminar or turbulent flow to the fluid inside the cell. Power was driven to the stirring shaft by a timing belt that was easily accessible for quick adjustment and removal. A variable speed motor controlled through a speed control recorder (SCR) provided the ability to change the speed of the stirring shaft. A digital tachometer indicated the rpm reading of the stirring shaft.

The modified HTHP fluid loss cell was utilized to form the mud filter cake with each of the ten drilling mud systems and to test various formulations for breaking mud filter cakes. In each test, a mud filter cake was obtained by filtration of the mud system on Fann specially hardened filter paper. A one lab barrel aliquot of the well mixed field drilling mud was poured into the HTHP cell and the cell was capped. Each test mud was heat-aged for a 20-minute period at 150° F. (65° C.) and 300-rpm stirring shear stress. After the 20-minute heat-aging period, the mud filter cake was generated by applying a 250-psi nitrogen differential pressure to atmosphere with 300-rpm stirring shear stress on the HTHP cell for three hours. Fluid loss data was recorded during the three-hour filter cake formation. After the 3-hour incubation period, the cell was depressurized, excess mud decanted out of the cell, and the mud filter cake was removed from the cell. The total weight and thickness of the mud filter cake was then determined.

Another lab barrel aliquot of each mud, respectively, was then added to the Dynamic HTHP fluid loss cell to generate a new filter cake which was then used to evaluate the ability of the Treatment Emulsion to break the mud filter cake. The procedure outlined in the paragraph above was repeated to generate each mud filter cake, respectively. At the end of the 3-hour period, the cell was removed from the heater jacket and depressurized. The HTHP cap was removed and the mud sample was decanted slowly from the cell. One lab barrel of the Treatment Emulsion was slowly poured down the side of the cell and the stirrer cap assembly was replaced on top of the cell. The HTHP cell was placed back into the pre-heated jacket at 150° F. and pressurized with 250-psi nitrogen. The Treatment Emulsion was stirred for 10 minutes at 300-rpm to simulate pumping of the Treatment Emulsion down the wellbore. Stirring rate was monitored and maintained with the speed controller and tachometer located on the motor assembly. After the 10-minute period, the stirrer mechanism was shut off and the Treatment Emulsion was allowed to stand for 17 hours at 150° F. and 250-psi nitrogen pressure. After the 17-hour static soak, the stirrer mechanism was restarted for a 10-minute period at 300-rpm to simulate pumping the Treatment Emulsion from the wellbore. After the 10-minute period, stirring was stopped and the HTHP cell was removed from the heater jacket and the pressure released. The HTHP cap was removed, and the Treatment Emulsion was decanted out of the cell. The HTHP cell bottom was removed and the hardened filter paper was removed to observe and quantify the remaining mud filter cake.

The post-treatment filter cake was evaluated for thickness and the remaining deposited residue by weight. Differences between the initial and post-treatment filter cake weight were used to calculate the % Mud Removal of the Treatment Emulsion for each mud filter cake. Table II sets forth the % Mud Removal for each the 10 test muds.

TABLE II

| Example No. | % Mud Removal |
|---|---|
| 3 | 92% |
| 4 | 99% |
| 5 | 95% |
| 6 | 75% (after drying, the remaining deposits were shown to be non-emulsified solids.) |
| 7 | 88% |
| 8 | 92% |
| 9 | 85% |
| 10 | 99% |
| 11 | 96% |
| 12 | 85% |

As presented in Table II, Examples 3-12 demonstrate the effectiveness of the Treatment Emulsion in breaking interfacial and/or rheological properties of filter cakes and acting as a demulsifier to break the water-in-oil emulsions of a wide range of mud types. Furthermore, the Treatment Emulsions were very efficient in breaking the residual emulsions inside the filter cake, decreasing cake cohesion, and reducing filter cake adherence.

Example 13

Two emulsions (Composition 3 and Comparative Composition 4) were prepared as designated below (percentages reference volume percentage):

| Composition 3: | Comparative Composition 4: |
|---|---|
| 51.2% of 15% HCl | 49.5% of US-40 |
| 4.7% of MDR-1 | 0.5% MDR-E |
| 0.5% of CI-25 | 0.5% of CI-25 |
| 41.7% of d-limonene | 49.5% of MDR-1 |
| 1.9% of E-31 | |

Composition 3 was prepared by introducing the d-limonene, CI-25 and E-31 into a vessel and mixing the components at room temperature until uniformly mixed, about 5 minutes. To the resultant was slowly added an aqueous system containing the HCl and MDR-1 while mixing at high shear. The components were then mixed at high shear until uniformly mixed, about 10 minutes. The resulting product contained the d-limonene and E-31 as the external phase and an aqueous internal phase. Comparative Composition 4 was prepared by introducing each of the components except MDR-1 into a vessel and mixing the components at room temperature until uniformly mixed, about 5 minutes. The MDR-1 was then added slowly while mixing at high shear, and then mixed at high shear for about 8 minutes.

Examples 14-16

The compositions of Example 13 were used to remove a filter cake deposited from two commercially available pH sensitive invert-emulsion reservoir drill-in fluids (DIFs), one of which, the 9.6 ppb DIF, contained sized calcium carbonate bridging material (approximately 40 ppb). 20 ppb formation shale and 10 ppb formation sand were added as drilled solids to each DIF.

For Example 14, a Brine/DIF emulsion was prepared by mixing the 9.6 ppg DIF with 9.6 ppg NaCl Brine in a 1:1 volume ratio. The resultant Brine/DIF emulsion was then mixed at a rate of 1000 rpm for about 1 minute, and was used in several tests summarized below.

In Examples 15 and 16, a 9.2 ppg commercial solids-free drill-in fluid was used without CaCO$_3$.

A dynamic (stirred) high-temperature high-pressure (HTHP) fluid loss cell and 10 micron ceramic disc were used to evaluate the effectiveness of Composition 3 and Comparative Composition 4 in removing the deposited DIF filter cake.

The test procedures are summarized as follows:

1. Establish initial production direction flow rate to diesel at 10 psi and 140° F.
2. Establish initial injection direction flow rate to diesel at 10 psi and 140° F.
3. Fill the cell with preheated drill-in fluid and begin the static leak-off test at 200 psi differential pressure and 140° F.
4. Record the filtrate volume every five minutes for four hours.

5. Decant the excess drill-in fluid without disturbing the filter cake.
6. For Example 14 and 16, place 50 cc's of the Brine/DIF emulsion of Example 14 on top of the deposited filter cake. For Example 15, no Brine/DIF emulsion was placed on top of the deposited filter cake.
7. Place 250 cc's of Composition 3 (Example 14) or Comparative Composition 4 (Example 16) on top of the Brine/DIF emulsion. In Example 15, 250 cc's of Comparative Composition 4 was placed directly on top of the deposited filter cake (Brine/DIF emulsion was not used).
8. Shut-in the cell at 200 psi for 48 hours at 140° F. Periodically open the bottom valve and check for fluid breaking through the filter cake. Once 10 cc's of break-through fluid was collected, the bottom valve was closed for the duration of the test.
9. After the shut-in time, decant the treatment fluid out of the HTHP cell.
10. Establish final production direction flow rate to diesel at 10 psi and 140° F.
11. Establish final injection direction flow rate to diesel at 10 psi and 140° F.
12. Calculate the percent return flow for both directions.

In Example 14, The Brine/DIF emulsion was used in Step 6 and Composition 3 was used in Step 7 of the test procedure. A return flow rate of 94% was obtained in the production direction and 89% in the injection direction, respectively. The Composition 3 treatment broke through both the Brine/DIF emulsion and the filter cake after approximately 55 minutes at 200 psi. The cell was thereafter shut-in for the remaining time.

In Examples 15 and 16, Comparative Composition 4 was used. No Brine/DIF emulsion was used in Example 15 and return flow rates of 95% and 93% were obtained in the production and injection directions, respectively. For Example 16, the Brine/DIF emulsion prepared for Example 14 was used in Step 6. Return flow rates of 99% in the production direction and an 83% in the injection direction were obtained.

Fluid loss results summarizing each of the Examples 14 to 16 are presented in Tables III, IV and V, respectively.

TABLE III

| Elapsed Time, minutes | Filtrate Weight (grams) | Filtrate Volume (cc) |
| --- | --- | --- |
| 5 | 1.3 | 1.1 |
| 10 | 1.4 | 1.2 |
| 15 | 1.4 | 1.2 |
| 20 | 1.5 | 1.3 |
| 25 | 1.5 | 1.3 |
| 30 | 1.6 | 1.4 |
| 35 | 1.6 | 1.4 |
| 40 | 1.7 | 1.5 |
| 50 | 1.7 | 1.5 |
| 55 | 1.8 | 1.5 |
| 65 | 1.8 | 1.6 |
| 70 | 1.9 | 1.7 |
| 80 | 1.9 | 1.7 |
| 85 | 2.0 | 1.7 |
| 90 | 2.1 | 1.8 |
| 120 | 2.1 | 1.8 |
| 125 | 2.2 | 1.9 |
| 145 | 2.2 | 1.9 |
| 150 | 2.3 | 2.0 |
| 180 | 2.3 | 2.0 |
| 185 | 2.4 | 2.1 |
| 215 | 2.4 | 2.1 |
| 220 | 2.5 | 2.2 |
| 240 | 2.5 | 2.2 |

TABLE IV

| Elapsed Time, minutes | Filtrate Weight (grams) | Filtrate Volume (cc) |
| --- | --- | --- |
| 5 | 13.2 | 12.0 |
| 10 | 13.4 | 12.1 |
| 15 | 13.5 | 12.2 |
| 20 | 13.6 | 12.3 |
| 25 | 13.6 | 12.3 |
| 30 | 13.7 | 12.4 |
| 35 | 13.7 | 12.4 |
| 40 | 13.9 | 12.6 |
| 45 | 13.9 | 12.6 |
| 50 | 14.0 | 12.7 |
| 55 | 14.0 | 12.7 |
| 60 | 14.1 | 12.8 |
| 70 | 14.1 | 12.8 |
| 75 | 14.2 | 12.9 |
| 80 | 14.3 | 13.0 |
| 85 | 14.3 | 13.0 |
| 90 | 14.4 | 13.1 |
| 100 | 14.4 | 13.1 |
| 105 | 14.5 | 13.1 |
| 120 | 14.5 | 13.1 |
| 125 | 14.5 | 13.1 |
| 130 | 14.6 | 13.2 |
| 135 | 14.7 | 13.3 |
| 145 | 14.7 | 13.3 |
| 150 | 14.8 | 13.4 |
| 165 | 14.8 | 13.4 |
| 170 | 14.9 | 13.5 |
| 175 | 14.9 | 13.5 |
| 180 | 15.0 | 13.6 |
| 200 | 15.0 | 13.6 |
| 205 | 15.1 | 13.7 |
| 220 | 15.1 | 13.7 |
| 225 | 15.2 | 13.8 |
| 235 | 15.2 | 13.8 |
| 240 | 15.3 | 13.9 |

TABLE V

| Elapsed Time, minutes | Filtrate Weight (grams) | Filtrate Volume (cc) |
| --- | --- | --- |
| 5 | 10.9 | 9.9 |
| 10 | 11.9 | 10.8 |
| 15 | 12.5 | 11.3 |
| 20 | 12.9 | 11.7 |
| 25 | 13.2 | 12.0 |
| 30 | 13.4 | 12.1 |
| 35 | 13.6 | 12.3 |
| 40 | 13.8 | 12.5 |
| 45 | 13.8 | 12.5 |
| 50 | 14.1 | 12.8 |
| 55 | 14.3 | 13.0 |
| 60 | 14.4 | 13.1 |
| 130 | 14.4 | 13.1 |
| 135 | 14.6 | 13.2 |
| 140 | 14.8 | 13.4 |
| 145 | 14.8 | 13.4 |
| 150 | 15.0 | 13.6 |
| 200 | 15.0 | 13.6 |
| 205 | 15.1 | 13.7 |
| 210 | 15.5 | 14.1 |
| 220 | 15.5 | 14.1 |
| 225 | 15.6 | 14.1 |
| 230 | 15.6 | 14.1 |
| 235 | 157 | 14.2 |
| 240 | 15.7 | 14.2 |

From the foregoing, it will be observed that numerous variations and modifications may be effected without departing from the true spirit and scope of the invention.

What is claimed is:

1. A method of removing an oil base or synthetic oil base filter cake from a wellbore and/or subterranean formation which comprises introducing into the wellbore a composition comprising a water-in-oil emulsion and a dispersing agent selected from the group consisting of organophosphates, organophosphonates and aminoalkyl phosphonic acids, salts or esters thereof, wherein solids from the filter cake are dispersed into the aqueous phase of the emulsion and further wherein at least a portion of the filter cake is removed from the wellbore.

2. The method of claim 1, wherein the outer phase of the water-in-oil emulsion is an organic solvent.

3. The method of claim 2, wherein the organic solvent is selected from the group consisting of aromatic petroleum cuts, terpenes, mono-, di- and tri-glycerides of saturated or unsaturated fatty acids, esters, minerals oils, chlorinated hydrocarbons, deodorized kerosene, naphtha, paraffins, isoparaffins, olefins, aliphatic hydrocarbons, aromatic hydrocarbons, long chain alcohols, ketones, nitrites, amides, amines, cyclic ethers, branched ethers, linear ethers, aliphatic ethers of glycols, pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, tetrahydrofuran, dioxane, dioxolane, methyltetrahydrofuran, dimethylsulfone, tetramethylene sulfone, thiophene, polyalkylene glycols, polyalkylene glycols ethers, polyalkylene glycols esters and mixtures thereof.

4. The method of claim 1, wherein the dispersing agent is a pH adjusting agent.

5. The method of claim 1, wherein the inner phase of the water-in-oil emulsion further comprises a pH adjusting agent.

6. The method of claim 1, wherein the inner phase of the water-in-oil emulsion is an aqueous salt solution.

7. The method of claim 6, wherein the aqueous salt solution is selected from the group consisting of sodium formate brine, potassium formate brine, cesium formate brine, sodium bromide brine, potassium bromide brine, cesium bromide brine, calcium bromide brine, zinc bromide brine, sodium chloride brine, potassium chloride brine, cesium chloride brine, calcium chloride brine, zinc chloride brine, seawater and mixtures thereof.

8. A method of removing an oil base or synthetic oil base filter cake containing drilled and/or deposited solids from a wellbore and/or subterranean formation comprising:
(a) introducing into the wellbore a composition comprising a water-in-oil emulsion and a dispersing agent selected from the group consisting of organophosphates, organophosphonates and aminoalkyl phosphonic acids, salts or esters thereof;
(b) digesting at least a portion of the filter cake with the composition wherein at least a portion of the solids are dispersed in the aqueous phase of the emulsion and further wherein at least a portion of the solids separate from the filter cake; and
(c) removing the aqueous phase containing at least a portion of the solids and at least a portion of the filter cake from the wellbore.

9. The method of claim 8, wherein the outer phase of the water-in-oil emulsion is an organic solvent.

10. The method of claim 9, wherein the organic solvent is selected from the group consisting of aromatic petroleum cuts, terpenes, mono-, di- and tri-glycerides of saturated or unsaturated fatty acids, esters, minerals oils, chlorinated hydrocarbons, deodorized kerosene, naphtha, paraffins, isoparaffins, olefins, aliphatic hydrocarbons, aromatic hydrocarbons, long chain alcohols, ketones, nitrites, amides, amines, cyclic ethers, branched ethers, linear ethers, aliphatic ethers of glycols, pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, tetrahydrofuran, dioxane, dioxolane, methyltetrahydrofuran, dimethylsulfone, tetramethylene sulfone, thiophene, polyalkylene glycols, polyalkylene glycols ethers, polyalkylene glycols esters and mixtures thereof.

11. The method of claim 8, wherein the inner phase of the water-in-oil emulsion further comprises a pH adjusting agent.

12. The method of claim 8, wherein the inner phase of the water-in-oil emulsion is an aqueous salt solution.

13. A method of removing an oil base or synthetic oil base filter cake from a wellbore and/or subterranean formation which comprises introducing a composition comprising a dispersing agent and a water-in-oil emulsion into the wellbore, wherein the outer phase of the water-in-oil emulsion is a terpene.

14. The method of claim 13, wherein the dispersing agent is a pH adjusting agent.

15. The method of claim 13, wherein the inner phase of the water-in-oil emulsion is an aqueous salt solution.

16. The method of claim 13, wherein the at least one terpene is selected from the group consisting of d-limonene, l-limonene, dipentene, myrcene, alpha-pinene, linalool and mixtures thereof.

17. A method of removing an oil base or synthetic oil base filter cake from a wellbore and/or subterranean formation which comprises introducing a composition comprising a water-in-oil emulsion into the wellbore, wherein the outer phase of the water-in-oil emulsion is a terpene, and further wherein solids from the filter cake are dispersed into the aqueous phase of the emulsion and further wherein at least a portion of the filter cake is removed from the wellbore.

18. The method of claim 17, wherein the composition further comprises a dispersing agent.

19. The method of claim 17, wherein the at least one terpene is selected from the group consisting of d-limonene, l-limonene, dipentene, myrcene, alpha-pinene, linalool and mixtures thereof.

20. The method of claim 17, wherein the inner phase of the water-in-oil emulsion further comprises a pH adjusting agent.

21. The method of claim 17, wherein the inner phase of the water-in-oil emulsion is an aqueous salt solution.

22. The method of claim 21, wherein the aqueous salt solution is selected from the group consisting of sodium formate brine, potassium formate brine, cesium formate brine, sodium bromide brine, potassium bromide brine, cesium bromide brine, calcium bromide brine, zinc bromide brine, sodium chloride brine, potassium chloride brine, cesium chloride brine, calcium chloride brine, zinc chloride brine, seawater and mixtures thereof.

23. A method of removing an oil base or synthetic oil base filter cake containing drilled and/or deposited solids from a wellbore and/or subterranean formation comprising:
(a) introducing into the wellbore a composition comprising a water-in-oil emulsion, wherein the outer phase of the water-in-oil emulsion is a terpene;
(b) digesting at least a portion of the filter cake with the composition wherein at least a portion of the solids are dispersed in the aqueous phase of the emulsion and further wherein at least a portion of the solids separate from the filter cake; and (c) removing the aqueous phase containing at least a portion of the solids and at least a portion of the filter cake from the wellbore.

24. The method of claim 23, wherein the composition further comprises a dispersing agent.

25. The method of claim 24, wherein the dispersing agent is a pH adjusting agent.

26. The method of claim 15, wherein the at least one terpene is selected from the group consisting of d-limonene, l-limonene, dipentene, myrcene, alpha-pinene, linalool and mixtures thereof.

27. The method of claim 23, wherein the inner phase of the water-in-oil emulsion is an aqueous salt solution.

* * * * *

UNITED STATES PATENT AND TRADEMARK OFFICE
CERTIFICATE OF CORRECTION

| | |
|---|---|
| PATENT NO. | : 7,481,273 B2 |
| APPLICATION NO. | : 11/820085 |
| DATED | : January 27, 2009 |
| INVENTOR(S) | : Paul H. Javora et al. |

It is certified that error appears in the above-identified patent and that said Letters Patent is hereby corrected as shown below:

Column 20, line 1, Claim 26, replace "of claim 15," with "of claim 23,"

Signed and Sealed this

Twenty-fifth Day of May, 2010

David J. Kappos
*Director of the United States Patent and Trademark Office*